US012758804B2

(12) United States Patent
Su

(10) Patent No.: US 12,758,804 B2
(45) Date of Patent: Oct. 13, 2026

(54) BRAKE CONTROL DEVICE FOR HIGH-RISE FIRE RESCUE SYSTEM

(71) Applicant: ZHUHAI SUOQI ELECTRONIC TECHNOLOGY CO., LTD., Zhuhai City (CN)

(72) Inventor: Guanghuan Su, Zhuhai City (CN)

(73) Assignee: ZHUHAI SUOQI ELECTRONIC TECHNOLOGY CO. LTD., Zhuhai (CN)

( * ) Notice: Subject to any disclaimer, the term of this patent is extended or adjusted under 35 U.S.C. 154(b) by 364 days.

(21) Appl. No.: 18/291,591

(22) PCT Filed: Nov. 21, 2022

(86) PCT No.: PCT/CN2022/133236
§ 371 (c)(1),
(2) Date: Jan. 24, 2024

(87) PCT Pub. No.: WO2023/138201
PCT Pub. Date: Jul. 27, 2023

(65) Prior Publication Data
US 2024/0335684 A1 Oct. 10, 2024

(30) Foreign Application Priority Data
Jan. 19, 2022 (CN) ......................... 202210059318.1

(51) Int. Cl.
*A62B 1/02* (2006.01)
*A62B 1/08* (2006.01)

(52) U.S. Cl.
CPC . *A62B 1/08* (2013.01); *A62B 1/02* (2013.01)

(58) Field of Classification Search
CPC ................ A62B 1/08; A62B 1/02; A62B 1/10
See application file for complete search history.

(56) References Cited

U.S. PATENT DOCUMENTS 6,232,686 B1 * 5/2001 Schneider ............ H02K 49/065
310/78
2015/0202469 A1 * 7/2015 Liu .......................... A62B 1/02
182/142

FOREIGN PATENT DOCUMENTS

CN 102155508 A 8/2011
CN 104453536 A 3/2015
(Continued)

OTHER PUBLICATIONS

Brake System A High-rise Fire Lifesaving Device; Patent No. 111135488; Document ID: CN 111135488 A; Date Published: May 12, 2020; Inventor: Su Guang-huan, Su Jin-xiang (Year: 2020).*
(Continued)

*Primary Examiner* — Mahdi H Nejad
(74) *Attorney, Agent, or Firm* — Nitin Kaushik

(57) ABSTRACT

This invention presents a brake control device for high-rise fire rescue systems, notable for its well-thought-out design, high safety standards, and consistent, dependable functionality. The system features two main elements: cable take-up device A on base frame A, and cable take-up device B on base frame B. A connecting device ensures the A transfer spindle of device A and the B transfer spindle of device B rotate in unison. Central to the system is the emergency braking device, comprising a reduction gearbox located under either the A or B cable take-up device. This gearbox is equipped with an input shaft and an output shaft, linked by a gear transmission set. The input shaft connects to the A or B cable take-up device via a transmission member. A magnetic block is affixed to the output shaft's end, and a permanent magnetic crane is positioned at the magnetic block's end.

9 Claims, 8 Drawing Sheets

(56) References Cited

FOREIGN PATENT DOCUMENTS

| | | | | | |
|---|---|---|---|---|---|
| CN | 207032976 U | | 2/2018 | | |
| CN | 108159581 A | | 6/2018 | | |
| CN | 111135488 A | | 5/2020 | | |
| CN | 111135490 A | | 5/2020 | | |
| CN | 114344746 A | | 4/2022 | | |
| CN | 120393322 A | * | 8/2025 | ............... | A62B 1/10 |
| JP | 012116602 A | | 6/2012 | | |

OTHER PUBLICATIONS

Brake For Combining Permanent-magnetic Brake With Frictional Brake And Braking Method; Patent No. 102155508; Document ID: CN 102155508 A; Date Published: Aug. 17, 2011; Inventor: He Ren, Zhang Duan-jun; Date Filed: May 4, 2011 (Year: 2011).*

Emergency Window Opening Device For Automobile Electric Window; Patent No. 104453536; Date Published: Mar. 25, 2015; Inventor: Yang, Wen-yun; Application No. CN 201310438689 A; Date Filed: Sep. 25, 2013 (Year: 2015).*

* cited by examiner

BRAKE CONTROL DEVICE FOR HIGH-RISE FIRE RESCUE SYSTEM

TECHNICAL FIELD

The invention relates to a braking control device, in particular, a braking control device for a high-rise fire rescue system.

BACKGROUND ART

At present, with the influx of people to the big cities, the urban environment seems more and more crowded, coupled with the scarcity of urban land resources, so the new buildings are getting taller and taller to ease the pressure of the city. However, with this comes a series of safety issues such as fire escape. In case of a fire on the ground floor, people on the upper floors can only continue to go up to the top of the building to escape. As the buildings are now very high, fire engines have been unable to put out fires on the upper floors, relying only on the floor's own firefighting facilities if they can not put out the fire, it is likely to make the fire more and more to the upper floors, and finally endanger the people who escape on the roof.

Now some floors less buildings equipped with escape rope, the human body in the rope ring, and then their own control of the speed of decentralization, from the roof down to the ground, this method is suitable for about ten floors of the building, but for twenty or thirty floors of the office building or residential, the person from the roof with rope tied down, it is clear that the health and safety of escapees are a challenge. In addition, for the elderly, infirm and people with fear of heights, even on the lower floor with rope escape is very unsafe.

After searching, patent number CN201811248241.2, patent name "A KIND OF HIGH-RISE FIRE RESCUE DEVICE" invention patent discloses the fire rescue device installed in the roof of a high-rise building, including a lift control host, A lifeboat and B lifeboat. The lift control host has a forward and reverse lift control system. The positive and negative lift control system includes the base frame and the left cable take-up device and the right cable take-up device installed on the base frame, the A lifeboat and B lifeboat are suspended on the first wire rope of the left cable take-up device and the right cable take-up device respectively; when used, the B lifeboat is first lowered to the downstairs, then the left cable take-up device and the right cable take-up device are connected together with the spool or reel in synchronous motion, and use the descending A lifeboat's spool or reel to connect the left cable take-up device to the right cable take-up device. And use the gravity of the descending A lifeboat as power, so that the left cable take-up device and the right cable take-up device reel to the first wire rope reel and unwinding, so repeatedly alternate, to achieve the synchronous reverse up and down vertical lift movement of the A lifeboat and B lifeboat. Although the patent can achieve the rescue transport volume of two-way life-saving box mode, can quickly and safely trapped in the fire on the roof of the building to the ground rescue personnel advantages, however, to a certain extent there are some shortcomings, such as: 1. The device is not equipped with emergency braking device, in the event of an emergency situation can only rely on the semi-automatic brake system brake, but the semi-automatic brake system does not stop in time, and the semi-automatic brake system may have brake pad wear resulting in brake failure; 2. The left cable take-up device and the right cable take-up device's shaft can be separated by connecting device or connecting pin, or the reel is connected together by connecting pin or gear set to achieve synchronous rotation, but no other connecting locking device is set, and the left cable take-up device and the right cable take-up device may be detached in the process of use, thus affecting the escape situation; 3. A lifeboat and B lifeboat are suspended in the left cable take-up device and the first wire rope of the right cable take-up device, there is a certain use of security risks.

SUMMARY

The technical problem to be solved by the present invention is to overcome the shortcomings of the prior art and provide a brake control device for high-rise fire rescue system with reasonable design, high safety performance and stable and reliable use performance.

The technical solution used in the present invention is: high building fire rescue device includes A cable take-up device mounted on the base frame A and a B cable take-up device mounted on the base frame B. The A transfer spindle of the A cable take-up device and the B transfer spindle of the B cable take-up device are connected together by a connection device to achieve synchronous rotation. The emergency braking device includes a reduction gearbox located below the A cable take-up device or the B cable take-up device. The reduction gear box includes an input shaft and an output shaft and a gear transmission set, the input shaft and the output shaft are connected by the gear transmission set, a transmission member is provided between the input shaft and the A cable take-up device or between the input shaft and the B cable take-up device, a magnetic block is provided at one end of the output shaft, and a permanent magnetic crane is provided at one end of the magnetic block.

Further, the A cable take-up device and the B cable take-up device both include two cable take-up drums, the inner side of both cable take-up drums are provided with a drive gear one, both ends of the input shaft are provided with a drive gear two, the drive member is a sprocket, and the drive gear one and the drive gear two are connected to each other by the sprocket.

Further, the lower end of the reduction gearbox is provided with a mounting base, both ends of the mounting base are provided with side risers, the upper end of one of the side risers is provided with a connecting cross plate, one end of the connecting cross plate is provided with a connecting longitudinal plate, a connecting square through tube is provided between the connecting cross plate and the mounting base, a mounting slot is provided in the middle of the connecting square through tube, a permanent magnet crane is fitted in the mounting slot, one end of the permanent magnet crane is provided with At least two nuts, the connecting longitudinal plate is provided with at least two adjusting bolts, adjusting bolts through the connecting longitudinal plate and the mounting slot and nuts connected, one end of the output shaft through the side plate and located in the other end of the permanent magnet crane.

Further, the other end of the output shaft is provided with a rotating handwheel, and the rotating handwheel can drive the A transfer spindle or the B transfer spindle to rotate by means of a sprocket, so that the connecting device can be docked smoothly.

Further, the base frame A is provided with a locking arm, one end of the locking arm is hinged on the base frame A, the other end of the locking arm is provided with a locking hook slot, the base frame B is provided with a locking post adapted to the locking hook slot, and after the connection device is docked, the locking arm is rotated to make the locking hook slot tighten the locking post, so that the base frame A and base frame B are connected and fixed together.

Further, the permanent magnetic crane is a manual permanent magnetic crane, the manual permanent magnetic crane includes a rotating hand lever and a permanent magnetic crane body connected to the rotating hand lever, the rotating hand lever through the mounting slot.

Further, the connection device comprises two coupling sleeves fixed to the end of the A transfer spindle and the end of the B transfer spindle respectively, the A transfer spindle and the B transfer spindle are fixed to each other by the two coupling sleeves, the end of the A transfer spindle and the end of the B transfer spindle are annularly arranged with a number of pin hole modules, the end of the coupling sleeves are annularly arranged with a number of pressed pin post modules adapted to the pin hole modules, the coupling sleeves are fixed to the A transfer spindle and the B transfer spindle respectively by pressing the pressed pin post modules into the pin hole modules.

Further, the coupling sleeve includes a first connection sleeve and a second connection sleeve located inside the first connection sleeve, the diameter of the first connection sleeve is larger than the diameter of the second connection sleeve, the outer side of the first connection sleeve is provided with a number of connection articulation blocks, the end of the A transfer spindle and the end of the B transfer spindle are annularly arranged with a number of bump sliders, the first connection sleeve and the first connection sleeve are provided with a hollow cavity adapted to the transfer spindle, and the inner wall of the hollow cavity is arranged with a number of groove sliders adapted to the bump sliders.

Further, the pressed pin post module includes a connection block, a sliding slot, a pressed sliding block and a pin post, the connection block is bolted to the outer wall of the second connection post sleeve, the sliding slot is fixed in the middle of the connection block, the pressed sliding block is fitted in the sliding slot, the pin post is fitted in the middle of the lower end of the pressed sliding block, the pin hole module includes a number of linearly arranged pin holes, the pin holes are fitted to the pin post.

Further, a brake mechanism is provided at both ends of the output shaft. The brake mechanism includes a brake disc, a brake pad, a brake drum and a spacer. The brake disc and the brake drum are mounted on the same axis, the brake disc is mounted on the output shaft, the brake pad is mounted in the gap between the brake disc and the brake drum, the spacer is mounted at the opening of the brake drum, the spacer includes a rectangular spacer and a tie rod, the rectangular spacer is hinged at the opening of the brake drum, the tie rod is connected to the rectangular spacer, and a control rod is connected between the two tie rods at both ends of the output shaft.

The beneficial effects of the invention are: 1. Through the permanent magnetic crane can suck the magnetic block in time when the invention needs emergency braking, so that the output shaft stops rotating, and stop the A cable take-up device or the B cable take-up device under the linkage of the reduction gear box and transmission member, so as to achieve emergency braking of the invention, and through the reduction gear box can effectively reduce the suction force that the permanent magnetic crane needs to provide when emergency braking; 2. A cable take-up device and B cable take-up device both include two cable take-up drums, two cable take-up drums can achieve double wire rope to control the lift of the invention, to provide the safety of the invention; 3. Locking arm and locking column cooperation, can be carried out to ensure the stability of the base frame A and base frame B after connecting device docking, to prevent the safety risks of connecting device detachment in the process of use

DETAILED DESCRIPTION OF THE EMBODIMENTS

Figure 1:
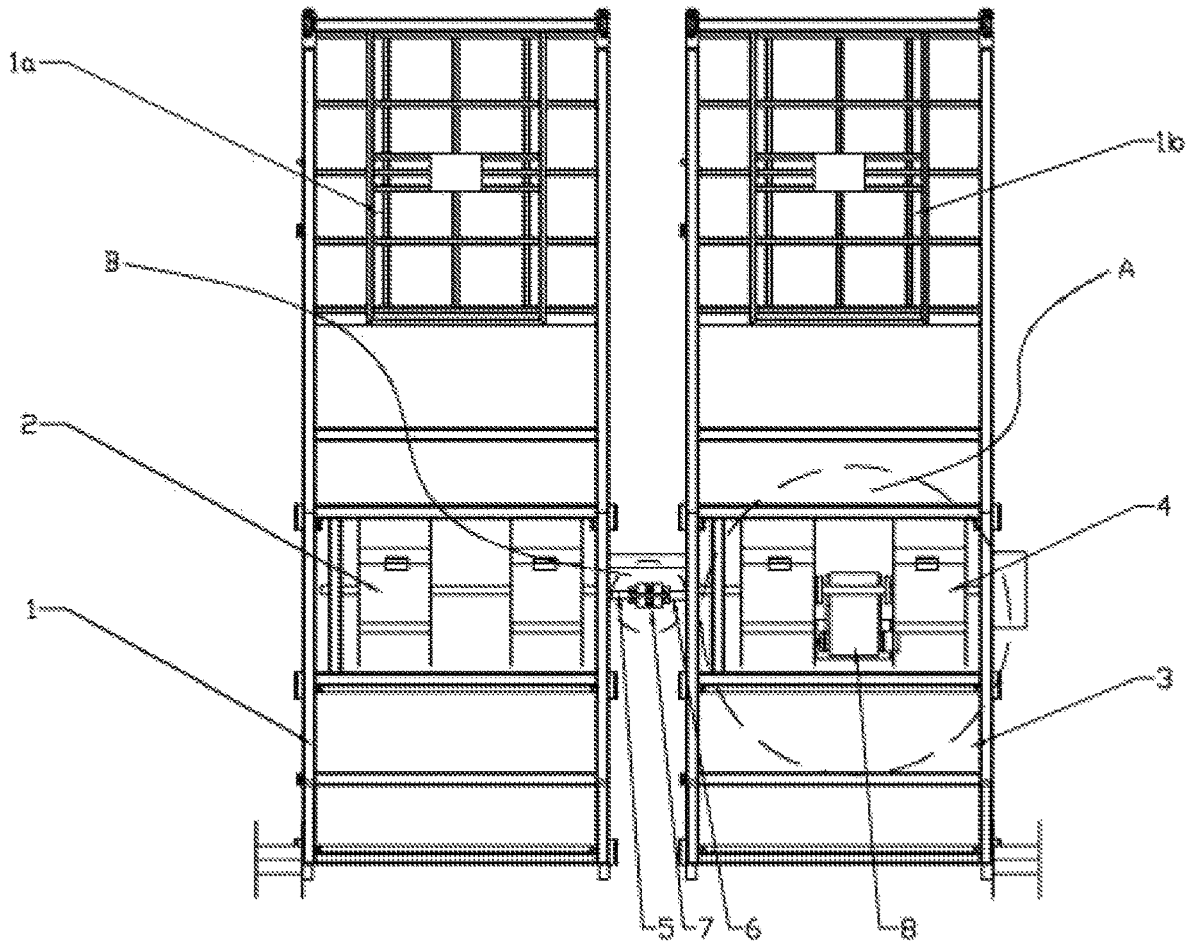
FIG. 1 is a top view of a high-rise fire rescue device.
Figure 2:
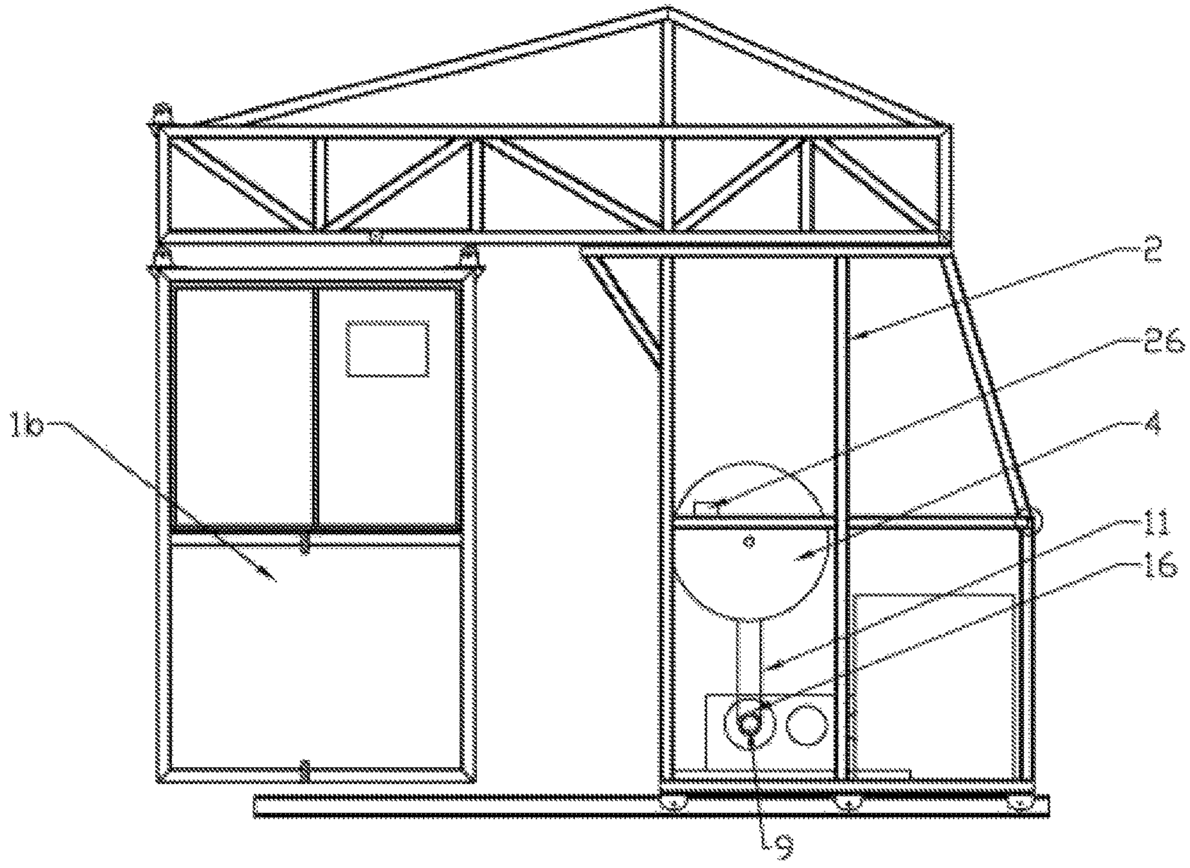
FIG. 2 is a side view of a high-rise fire rescue device.
Figure 3:
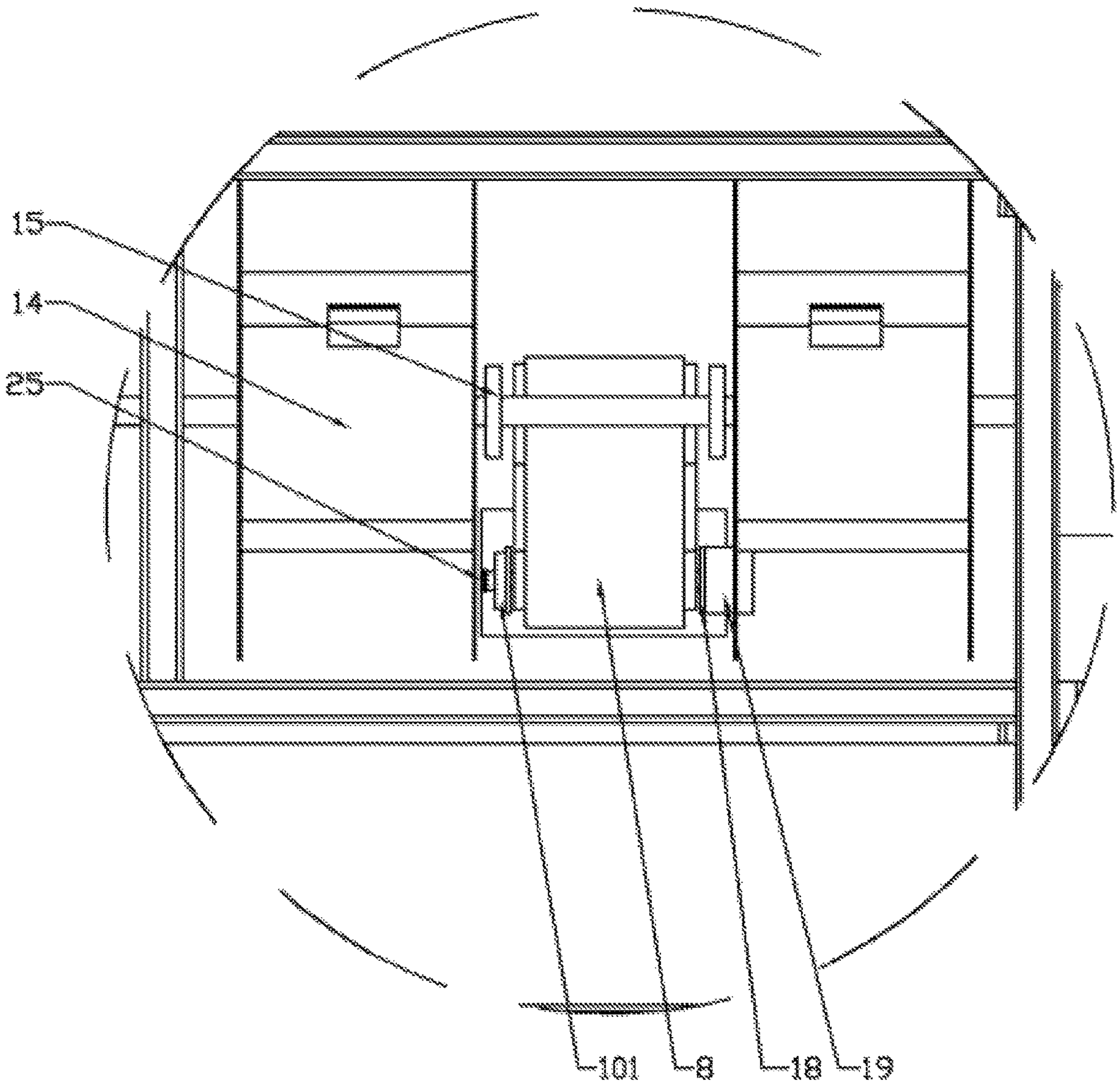
FIG. 3 is an enlarged schematic view of part of FIG. 1A.
Figure 4:
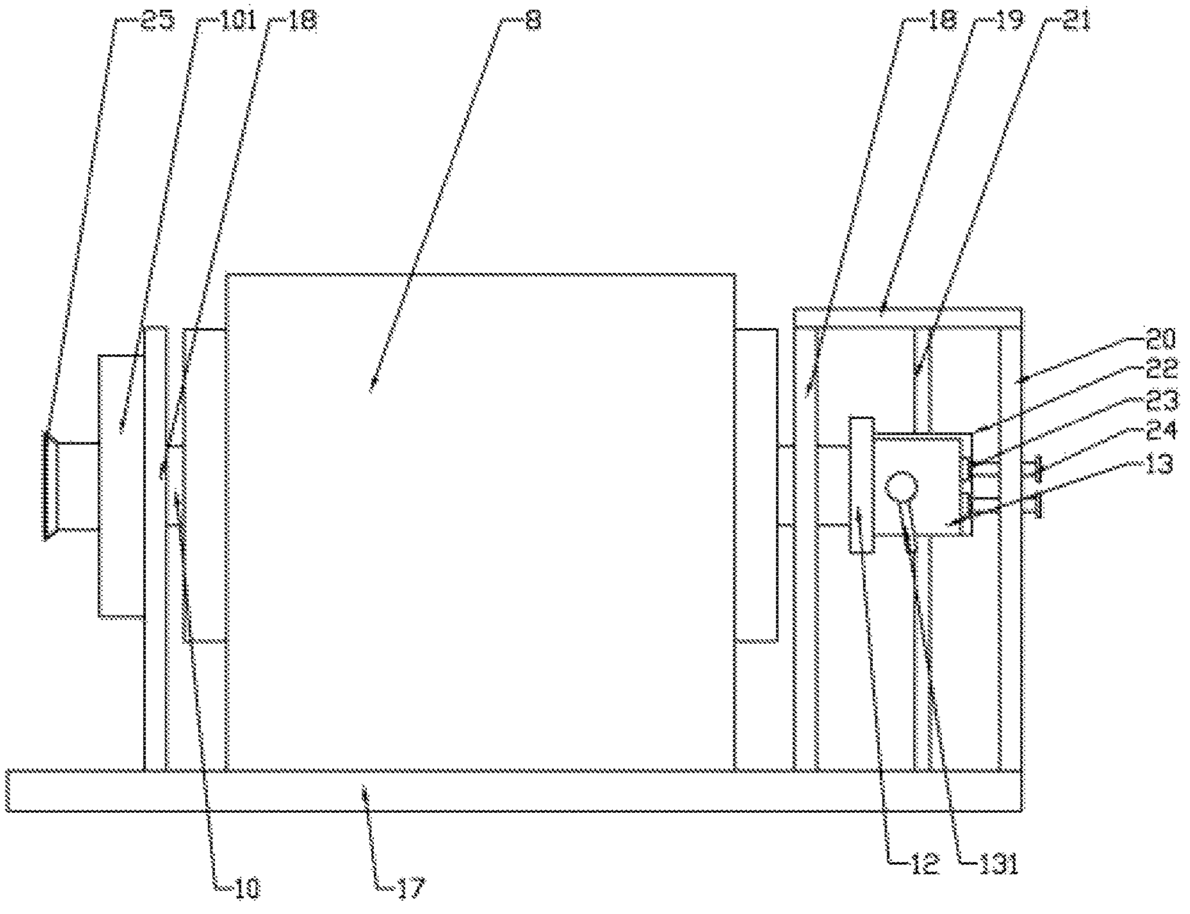
FIG. 4 is a rear view of the present invention.
Figure 5:
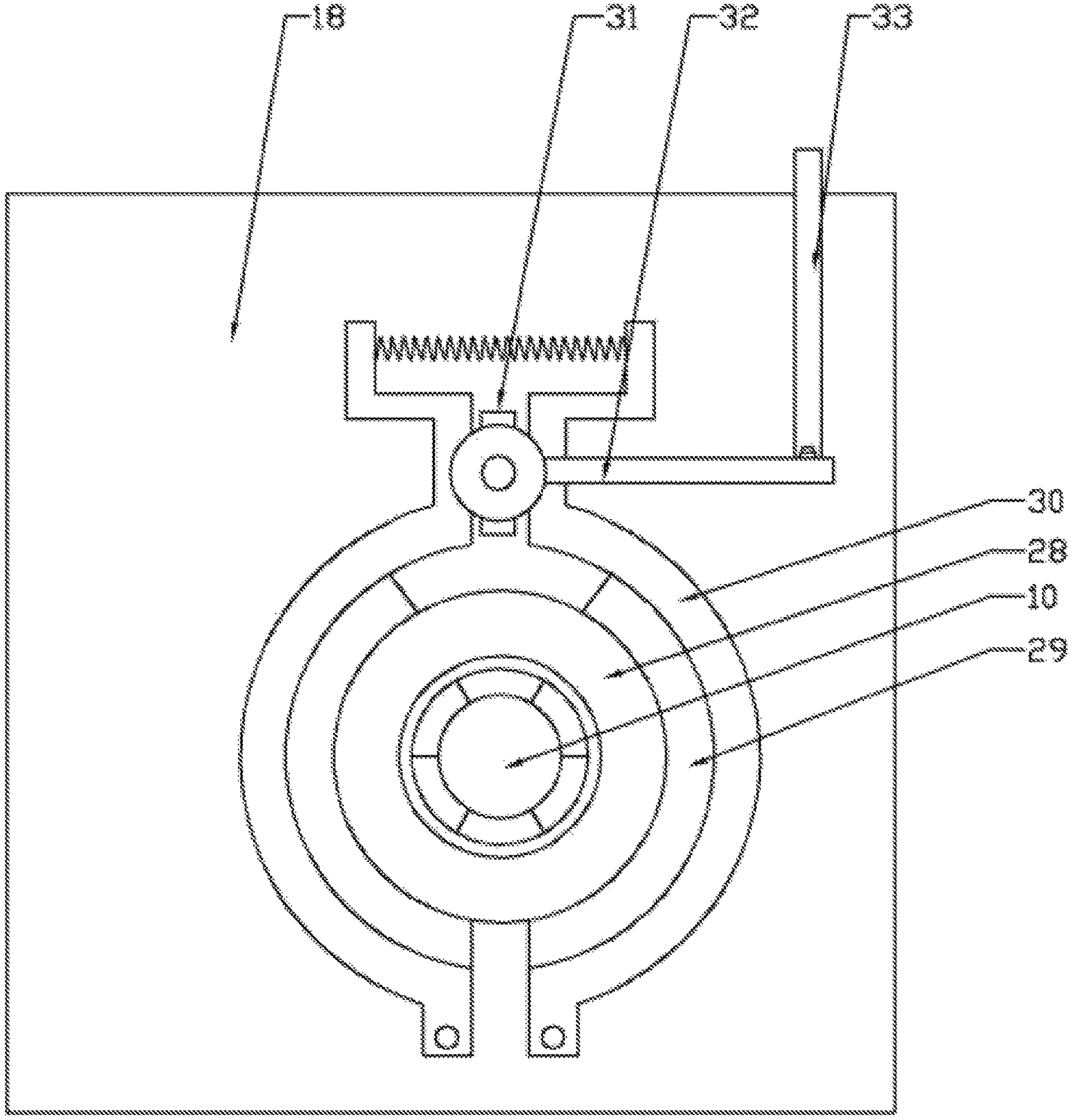
FIG. 5 is a side view of a brake mechanism.
Figure 6:
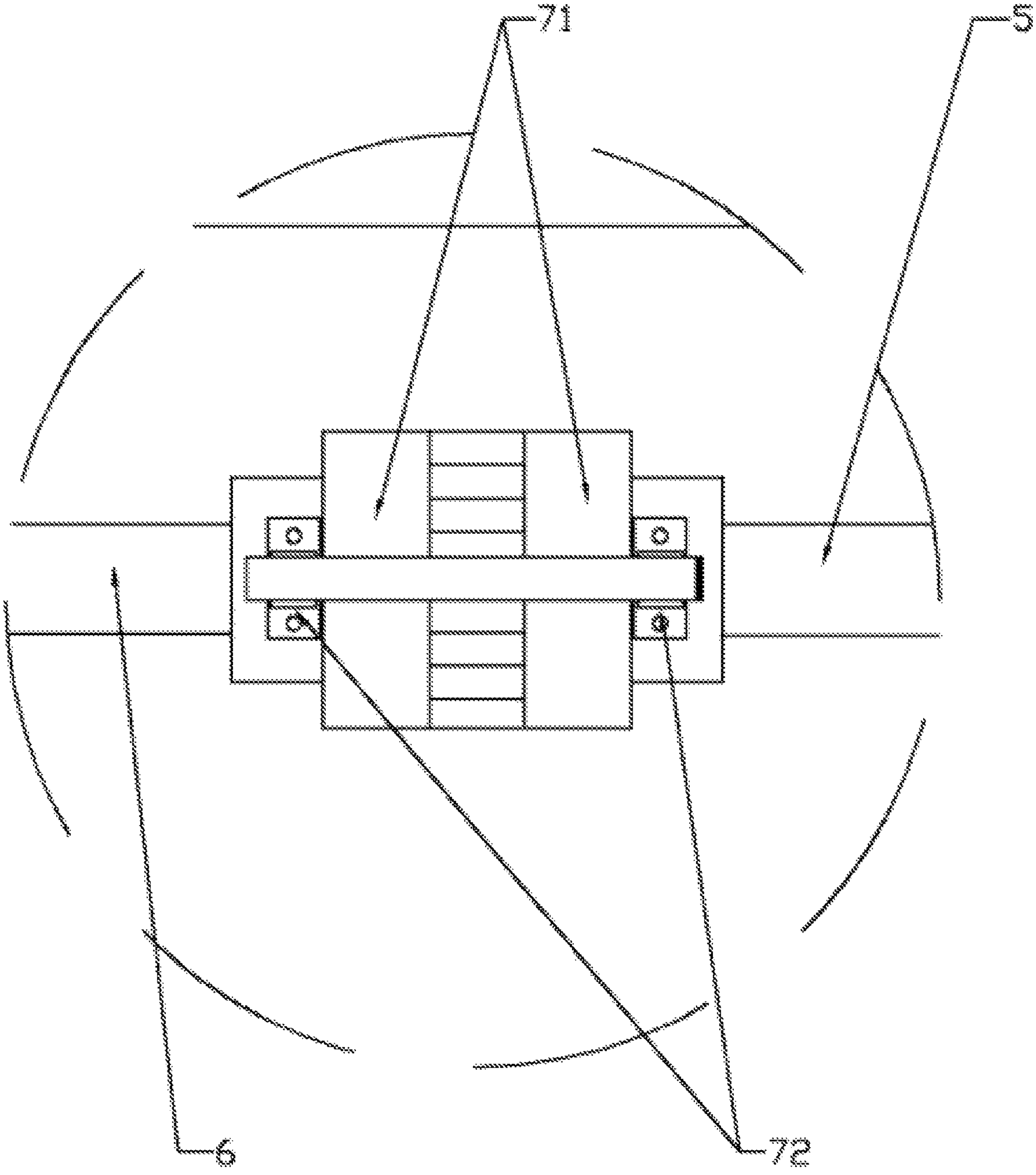
FIG. 6 is an enlarged schematic view of part of FIG. 1B.
Figure 7:
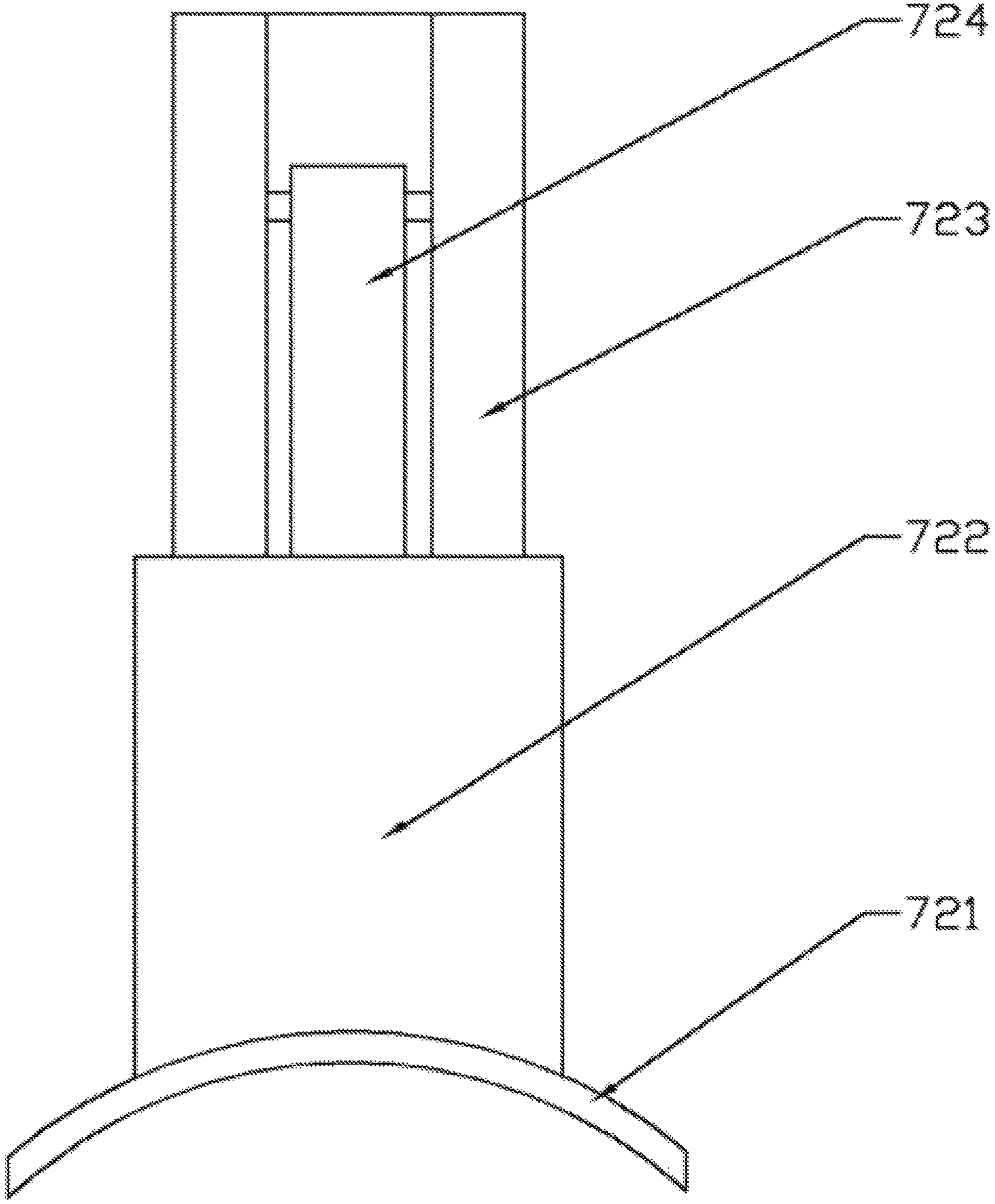
FIG. 7 is a main view of a pressed pin post module.
Figure 8:
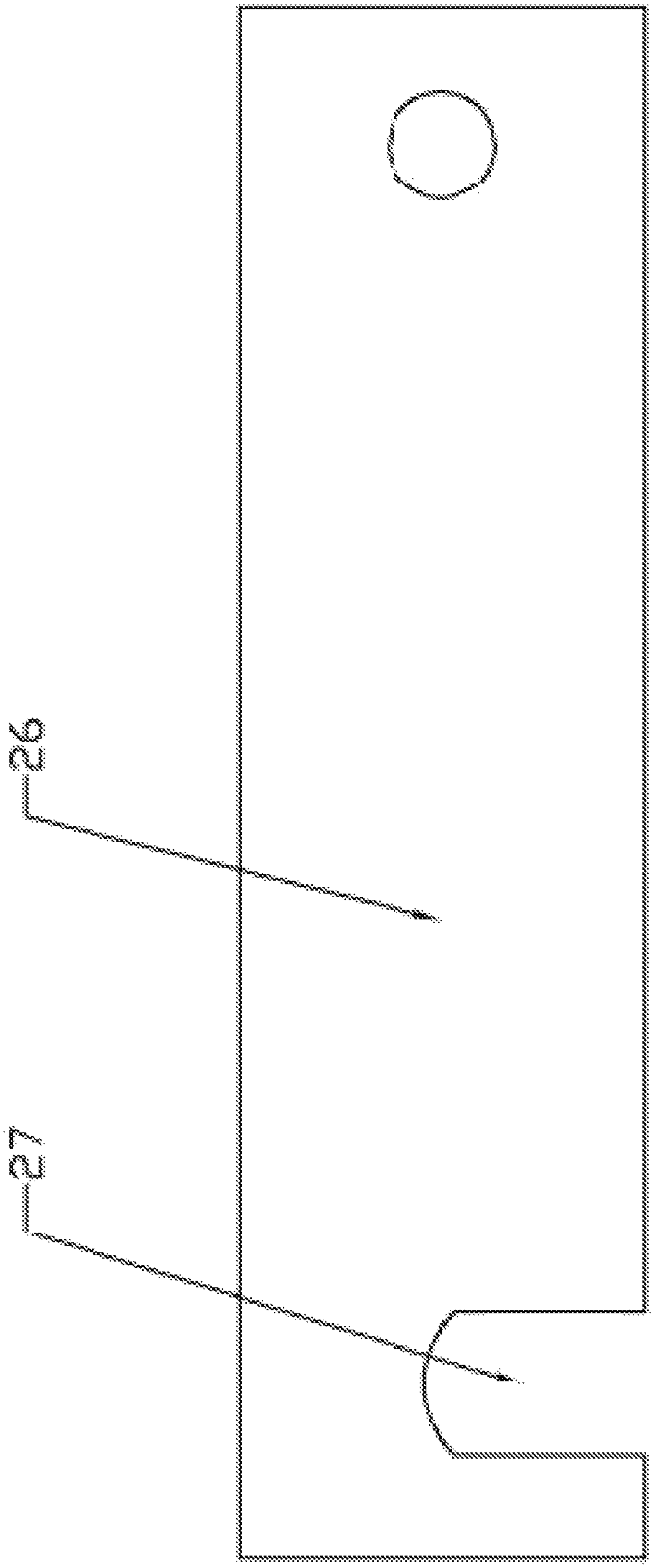
FIG. 8 is a main view of the locking arm.

As shown in FIGS. 1 to 8, in this embodiment, the high-rise fire rescue device includes an A cable take-up device 2 mounted on a base frame A1 and a B cable take-up device 4 mounted on a base frame B3. The A transfer spindle 5 on the A cable take-up device 2 and the B transfer spindle 6 of the B cable take-up device 4 are connected together by a connection device 7 to achieve synchronous rotation, the emergency braking device includes a reduction gear box 8 located below the B cable take-up device The emergency braking device includes a reduction gear box 8 located below the B cable take-up device 4, the reduction gear box 8 includes an input shaft 9 and an output shaft 10 and a gear transmission set, the input shaft 9 and the output shaft 10 are connected by the gear transmission set, a transmission member 11 is provided between the input shaft and the A cable take-up device 2 or between the input shaft 9 and the B cable take-up device 4, a magnetic block 12 is provided at one end of the output shaft 10, a permanent magnetic crane 13 is provided at one end of the magnetic block 12 The lower end of the reduction gearbox 8 is provided with a mounting base 17, both ends of the mounting base 17 are provided with side plates 18, one of the upper ends of the side plates 18 is provided with a connecting horizontal plate 19, one end of the connecting horizontal plate 19 is provided with a connecting longitudinal plate 20, between the connecting horizontal plate 19 and the mounting base 17 is provided with a connecting square tube 21, the middle of the connecting square tube 21 is provided with a mounting slot 22, the mounting slot 22 The permanent magnetic crane 13 is installed in the installation slot 22, one end of the permanent magnetic crane 13 is provided with at least two nuts 23, the connecting longitudinal plate 20 is provided with at least two adjusting bolts 24, adjusting bolts 24 through the connecting longitudinal plate 20 and the installation slot 22 and nuts 23 connected, this design can be adjusted by adjusting bolts 24 position of the permanent magnetic crane 13, one end of the output shaft 10 through the side plate 18 and located in the The other end of the permanent magnetic crane 13, the permanent magnetic crane 13 is a manual permanent magnetic crane 13, manual permanent magnetic crane 13 includes a turning hand lever 131 and a permanent magnetic crane body connected to the turning hand lever 131, turning hand lever 131 through the installation slot 22, this design can be in need of emergency braking, breaking the turning hand lever 131, so that the magnetic field of the permanent magnetic crane 13 to absorb the magnetic block 12, so as to Lock the output shaft 10, so that the B cable take-up device 4 stop rotation, and through the reduction gear box 8 can better emergency brake the lift of the invention.

In this example, A cable take-up device 2 or B cable take-up device 4 both include two cable take-up drums 14, both cable take-up drums 14 are provided with drive gear one 15 on the inside, both ends of input shaft 9 are provided with drive gear two 16, drive member 11 is a sprocket, drive gear one 15 and drive gear two 16 are connected to each other through the sprocket, the front end of base frame A1 is provided with a liftable The front end of the base frame A1 is set with a liftable escape bin Ala, two cable take-up roller 14 of the two wire rope are connected with the escape bin Ala, the front end of the base frame B3 is set with a liftable escape bin B1*b*, two cable take-up roller 14 of the two wire rope are connected with the escape bin B1*b*, this design through the double wire rope to achieve the lift of the escape bin Ala and the escape bin B1*b*, reducing the use of the invention in the process of the existence of safety hazards during the use of the invention.

In this example, the other end of the output shaft 10 is provided with a rotating handwheel 25, and the rotating handwheel 25 can drive the B transfer spindle 6 to rotate through the sprocket, so that the connecting device 7 can be docked smoothly, and under the action of the reduction gearbox 8, the rotation and docking of the connecting device 7 can be achieved without great effort.

In this example, the base frame A1 is provided with locking arm 26, one end of the locking arm 26 is hinged on the base frame A1, the other end of the locking arm 26 is provided with locking hook slot 27, the base frame B3 is provided with a locking post that fits the locking hook slot 27, after the connection device 7 is docked, the locking arm 26 is rotated to make the locking hook slot 27 tighten the locking post, so that the base frame A1 and base frame B3 are connected and fixed together. This design can improve the fixing effect of A cable receptacle 2 and B cable receptacle 4 when the high-rise fire rescue device is in use, and avoid the situation that the connection device 7 between A cable receptacle 2 and B cable receptacle 4 is detached after the trapped person enters the high-rise fire rescue device, thus making the invention safer and the performance of the high-rise fire rescue device more stable and reliable.

In this example, the connection device (7) comprises two coupling sleeves (71) fixed to the end of the A transfer spindle (5) and the end of the B transfer spindle (6) respectively, the A transfer spindle (5) and the B transfer spindle (6) being fixedly connected by the two coupling sleeves (71), the end of the A transfer spindle (5) and the end of the B transfer spindle (6) being annularly arranged with a number of pin hole modules, the coupling sleeves (71) has a number of pressed pin post modules (72) arranged in a circular pattern at the end of the coupling sleeve (71) which are adapted to the pin post modules, and the coupling sleeve (71) is fixed to the A transfer spindle (5) and the B transfer spindle (6) respectively by pressing the pressed pin post modules (72) into the pin post modules, and the coupling sleeve is fixed to the A transfer spindle (5) and the B transfer spindle (6) by means of the pressed pin post modules (72). This design allows the coupling sleeve 71 to be fixed to the A transfer spindle (5) or B transfer spindle (6) by sliding the coupling sleeve (72) into place on the A transfer spindle (5) or B transfer spindle (6) and then pushing the coupling sleeve 72 of base frame A1 and the coupling sleeve 72 of base frame B2 for docking, making the overall operation more convenient and fast.

In this example, the coupling sleeve (71) comprises a first connecting sleeve and a second connecting sleeve located on the inside of the first connecting sleeve, the diameter of the first connecting sleeve is larger than the diameter of the second connecting sleeve, a number of connecting articulation blocks are provided on the outside of the first connecting sleeve, a number of bump sliders are arranged in a circular formation on the end of both the A transfer spindle (5) and the end of the B transfer spindle (6), the first connecting sleeve and the first The first connecting sleeve and the first connecting sleeve are provided with a hollow cavity adapted to the transfer spindle, and the inner wall of the hollow cavity is arrayed with a number of groove sliders adapted to the bump sliders, and the bump sliders 51 and the groove sliders cooperate with each other to enable the coupling sleeve (71) to slide at the end of the A transfer spindle (5) and the upper limit of the B transfer spindle (6), and to enable the coupling sleeve (71) to drive the end of the A transfer spindle (5) and the B transfer spindle (6) more stably.

In this example, the pressed pin post module (72) includes a connection block (721), a sliding slot (722), a pressed sliding block (723) and a pin post (724), the connection block (721) is bolted to the outer wall of the second connection post sleeve, the sliding slot (722) is fixed to the middle of the connection block (721), the pressed sliding block (723) is adapted to be mounted in the sliding slot (722), the pin post (724) is installed in the middle of the lower end of the press sliding block (723), the pin hole module includes a number of linearly arranged pin holes, and the pin holes are adapted to the pin post (724), this design can make the coupling sleeve 71 slide in place, the press sliding block 723 will be pressed down to make the pin post 724 inserted into the pin holes, so as to complete the fixed connection.

In this example, both ends of the output shaft 10 are provided with a brake mechanism 101, the brake mechanism 101 includes a brake disc 28, a brake pad 29, a brake drum 30 and a spacer, the brake disc 28 and the brake drum 30 are mounted on the same axis, the brake disc 28 is mounted on the output shaft 10, the brake pad 29 is mounted in the gap between the brake disc 28 and the brake drum 30, and the spacer is mounted at the opening of the brake drum 30. The brace rod includes a rectangular brace block 31 and a tie rod 32, the rectangular brace block 31 is hinged at the opening of the brake drum 30, the tie rod 32 is connected to the rectangular brace block 31, and a control rod 33 is connected between the two tie rods 32 at both ends of the output shaft 10. When you need to brake, you only need to hand lift the lever 32, you can make the rectangular brace block 31 reset, so that the brake pad 29 on the brake disc 28 friction, so as to play a braking effect, and through the double brake mechanism 101, making the braking effect of the high-rise fire rescue device more reliable, the use of the entire device is safer, more stable performance, this design can also be connected to the lever 32 through the traction line, by hand pulling This design can also be connected to the lever 32 through the traction wire, and the lever 32 can be pulled down by hand to release the brake mechanism 101, thus improving the control effect of the brake mechanism 101.

The present invention is applied to the technical field of high building escape devices.

Although the embodiments of the present invention are described in terms of actual solutions, they do not constitute a limitation on the meaning of the invention, and modifications of its embodiments and combinations with other solutions in accordance with the present specification are obvious to those skilled in the art.

What is claimed is:

1. A braking control device for a high-rise fire rescue system, the high-rise fire rescue system comprising: an A cable take-up device (2) mounted on a base frame A (1) and a B cable take-up device (4) mounted on a base frame B (3), an A transfer spindle (5) on the A cable take-up device (2) and a B transfer spindle (6) of the B cable take-up device (4) being connected together by a connection device (7) to achieve synchronous rotation; wherein the braking control device comprises a reduction gearbox (8) located below the A cable take-up device (2) or the B cable take-up device (4), wherein the reduction gearbox (8) comprises an input shaft (9) and an output shaft (10) and a gear train, the input shaft (9) and the output shaft (10) is connected by the gear train, the input shaft (9) is connected to the A cable take-up device (2) or a drive member (11) is provided between the input shaft (9) and the B cable take-up device (4), a magnetic block (12) is provided at one end of the output shaft (10), and a permanent magnetic crane (13) is provided at one end of the magnetic block (12);

wherein a mounting base (17) is provided at a lower end of the reduction gear box (8), a side plate (18) is provided at each end of the mounting base (17), a connecting horizontal plate (19) is provided at an upper end of one side plates (18), and a connecting longitudinal plate (20) is provided at one end of the connecting horizontal plate (19); a connecting square tube (21) is provided between the connecting horizontal plate (19) and the mounting base (17), a central part of the connecting square tube (21) is provided with a mounting slot (22), the mounting slot (22) is fitted with the permanent magnetic crane (13), one end of the permanent magnetic crane (13) is provided with at least two nuts (23), the connecting longitudinal plate (20) is provided with at least two adjusting bolts (24), the adjusting bolts (24) are connected to the nuts (23) through the connecting longitudinal plate (20) and the mounting slot (22), one end of the output shaft (10) passes through the one side plate (18) and is located at an other end of the permanent magnetic crane (13), and an other end of the output shaft (10) passes through an other side plate (18).

2. The braking control device for the high-rise fire rescue system according to claim 1, characterized in that: the A cable take-up device (2) and the B cable take-up device (4) each comprises two cable take-up drums (14), an inner side of each cable take-up drums (14) is provided with drive gear one (15), both ends of the input shaft (9) are provided with drive gear two (16), the drive member (11) is a sprocket, and the drive gear one (15) and the drive gear two (16) are connected to each other by the sprocket.

3. The braking control device for the high-rise fire rescue system according to claim 2, characterized in that an other end of the output shaft (10) is provided with a turning handwheel (25), and the turning handwheel (25) drives the A transfer spindle (5) or the B transfer spindle (6) to rotate through the sprocket, so that the connection device (7) is docked smoothly.

4. The braking control device for the high-rise fire rescue system according to claim 3, characterized in that: the base frame A (1) is provided with a locking arm (26), one end of the locking arm (26) is hinged on the base frame A (1), an other end of the locking arm (26) is provided with a locking hook slot (27), the base frame B (3) is provided with a locking post adapted to the locking hook slot (27), and after the connection device (7) is docked, the locking arm (26) is rotated so that the locking hook slot (27) clamps the locking post, thus the base frame A (1) and the base frame B (3) are connected and fixed together.

5. The braking control device for the high-rise fire rescue system according to claim 3, characterized in that: a brake mechanism (101) is provided at each ends of the output shaft (10), the brake mechanism (101) comprises a brake disc (28), a brake pad (29), a brake drum (30) and a spacer, the brake disc (28) and the brake drum (30) are mounted on a same axis, the brake disc (28) is mounted on the output shaft (10), the brake pad (29) is mounted on a gap between the brake disc (28) and the brake drum (30), the spacer is mounted on an opening of the brake drum (30), the spacer comprises a rectangular brace block (31) and a tie rod (32), the rectangular brace block (31) is hinged on the opening of the brake drum (30), the tie rod (32) is connected to the rectangular brace block (31), and a control rod (33) is connected between two tie rods (32) at both ends of the output shaft (10).

6. The braking control device for the high-rise fire rescue system according to claim 1, characterized in that: the permanent magnetic crane (13) is a manual permanent magnetic crane (13), the manual permanent magnetic crane (13) comprises a turning hand lever (131) and a permanent magnetic crane body connected to the turning hand lever (131), the turning hand lever (131) is pierced through the mounting slot (22).

7. The braking control device for the high-rise fire rescue system according to claim 1, characterized in that the connection device (7) comprises two coupling sleeves (71) fixed to an end of the A transfer spindle (5) and an end of the B transfer spindle (6) respectively, the A transfer spindle (5) and the B transfer spindle (6) are fixedly connected by the two coupling sleeves (71), the end of the A transfer spindle (5) and the end of the B transfer spindle (6) are annularly arranged with a number of pin hole modules, and an end of each of the coupling sleeves (71) is annularly arranged with a number of pressed pin post modules (72) adapted to the pin hole modules, and each of the coupling sleeves (71) is fixed to the A transfer spindle (5) and the B transfer spindle (6) respectively by pressing the pressed pin post modules (72) into the pin hole modules.

8. The braking control device for the high-rise fire rescue system according to claim 7, characterized in that each of the coupling sleeves (71) comprises a first connecting column sleeve and a second connecting column sleeve located on an inner side of the first connecting column sleeve, a diameter of the first connecting column sleeve is larger than the diameter of the second connecting column sleeve, an outer side of the first connecting column sleeve is provided with a number of connecting articulation blocks, the end of the A transfer spindle (5) and the end of the B transfer spindle (6) are annularly arranged with a number of bump slides, each of the first connecting column sleeve and the second connecting column sleeve is provided with a hollow cavity adapted to each of the A transfer spindle (5) and the B transfer spindle (6), and an inner wall of the hollow cavity is arrayed with a number of groove slides adapted to the bump slides.

9. The braking control device for the high-rise fire rescue system according to claim 8, characterized in that: the each of the pressed pin post modules (72) comprises a connection block (721), a sliding slot (722), a pressed sliding block (723) and a pin post (724), the connection block (721) is bolted to an outer wall of the second connection column sleeve, the sliding slot (722) is fixed to the connection block (721), the press sliding block (723) is adapted to be mounted in the sliding slot (722), the pin post (724) is mounted in a middle of a lower end of the pressed sliding block (723), each of the pin hole modules comprises a number of linearly arranged pin holes, and the pin holes are adapted to the pin post (724).

* * * * *